Figure 1:
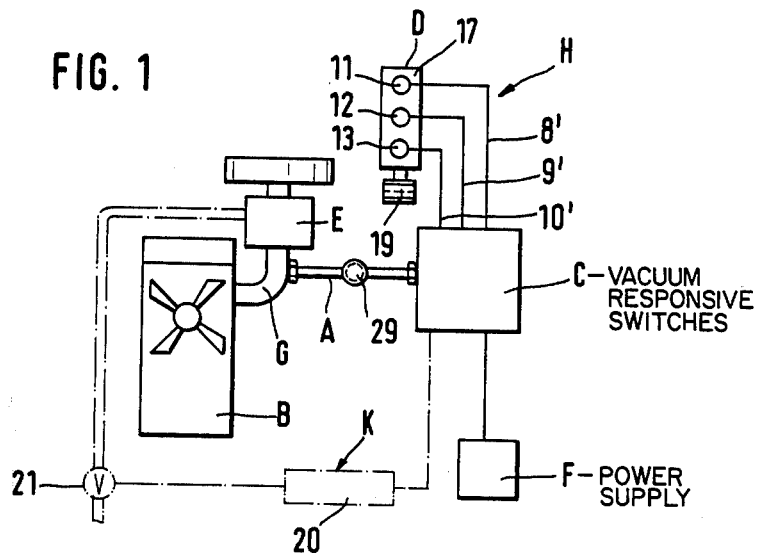

United States Patent [19]

Reissmüller

[11] 4,245,497

[45] Jan. 20, 1981

[54] MONITORING AND REMOTE-INDICATOR APPARATUS FOR VACUUM-GENERATING INTERNAL COMBUSTION ENGINES

[76] Inventor: Anton Reissmüller, Failenschmidstrasse 28, 7320 Göppingen-Jebenhausen, Fed. Rep. of Germany

[21] Appl. No.: 29,783

[22] Filed: Apr. 13, 1979

[30] Foreign Application Priority Data

Apr. 15, 1978 [DE] Fed. Rep. of Germany ....... 2816394

[51] Int. Cl.³ ...................... G01M 15/00; G01L 7/04
[52] U.S. Cl. ........................................ 73/115; 73/736; 340/136
[58] Field of Search ................... 73/115, 736; 340/136, 340/626

[56] References Cited

U.S. PATENT DOCUMENTS

| | | | |
|---|---|---|---|
| 2,027,875 | 1/1936 | Odend'hal | 73/736 X |
| 3,013,234 | 12/1961 | Bourns | 73/736 X |
| 3,492,638 | 1/1970 | Lane | 340/136 X |
| 4,072,047 | 2/1978 | Reissmuller | 73/115 |

Primary Examiner—James J. Gill
Attorney, Agent, or Firm—Martin A. Farber

[57] ABSTRACT

Device for the continuous monitoring and remote indication of the prevailing operating condition of internal combustion engines serving preferably as a drive for motor vehicles based on the vacuum pressure occurring in the intake manifold, characterized by the combination of the following features: two Bourdon tubes are used as pressure measuring members, which Bourdon tubes are fastened each with one end rigidly on a common carrier, of which one Bourdon tube is completely closed and consequently is influenced only by outside air pressure, while the other Bourdon tube is connectable to the suction intake manifold of the internal combustion engine; arrangement of a carrier body for a number of contact elements at the free end of the Bourdon tube which is influenced by the outer air pressure, which contact elements by means of electrical lines are to be brought into connection with preferably optical indicator means such as different colored diodes and lamps, respectively; and arrangement of a carrier body for the same number of counter contact elements on the end of the second Bourdon tube which is connectable to the intake manifold pipe of the internal combustion engine, of which the two outer contact elements are connected comparatively fixedly with the end of the Bourdon tube, while on the other hand the middle contact(s) is formed slightly elastically flexible.

12 Claims, 3 Drawing Figures

MONITORING AND REMOTE-INDICATOR APPARATUS FOR VACUUM-GENERATING INTERNAL COMBUSTION ENGINES

The invention covers a monitoring and remote indication device according to the species abstract (the introduction) of the main claim.

In the device of this type of the same inventor, which device is determined for the same purpose and published under German OS No. 25 51 359, already the use is provided of a single (Bourdon) spring tube as an actuator which is mechanically moveable by the vacuum in the intake manifold of an internal combustion engine, which actuator differs advantageously from the physically similar acting actuators in the form of metal boxes or communication bellows by a multiple higher numer of allowable stress cycle or load applications with the large pressure fluctuations occurring in the intake manifold of internal combustion engines up to about 0.8 bar. For detecting and indicating the movements of the mechanical actuator which is applied by vacuum pressure in the intake manifold, with the device according to German OS No. 25 51 359 an optical-electronic system which operates contact-free was provided in order to eliminate possible frictionally-caused indication errors. In practical driving operation with the devices according to the older application, however, still certain disadvantages were shown, first of all a rather strong influencing of the precision of the indicator by the prevailng atmospheric pressure and a coparatively large technical and economical expense for the optical-electronic sensing pick-up and indicator system.

The task of the present invention is to improve the known monitoring and remote indication device in that the influence of the variable outer atmospheric conditions on the monitoring and indicating functioning is extensively eliminated and (with simultaneous considerable reduction of the production expense) the service life and the operating security reliability of the device is substantially increased once again by a very considerable increase in the number of permissible pressure variation cycles in the Bourdon spring tube which is mechanically moveable by the pressure fluctuations in the intake manifold.

This task is substantially solved by a formation according to the features (a) to (c) of claim 1.

By the cooperation of these features as a result of the arrangement of the pairs of contact elements on the free ends of two Bourdon tubes which are fastened on a common carrier, of which tubes one is completely closed and thus alone is influenced by atmospheric pressure, while the interior space of the other Bourdon tube from which with the changing motor load and corresponding position of the throttle valve very high intense oscillating vacuum pressure in the intake manifold is applied, it has been achieved that the influence of the atmospheric air pressure on the indicating precision of the apparatus has been extensively eliminated. Thereby the indicating functioning of the device in accordance with the invention in effect has been made independent of all oscillations of the atmospheric air pressure, which e.g., are quite considerable during driving for distances with large level differences. The transition from the optical-electronic scanning pick-up or sensing of the mechanical movements of the free Bourdon tube-end, which sensing is provided for the previously known monitoring device, which movements naturally selectively could also be used by the subject matter of the present invention, to the electromechanical contact elements on the moveable ends of the two Bourdon tubes (which contact elements are provided for the normal embodiment of the monitoring and indicating device in accordance with the present invention), (besides a considerable simplification and consequently associated lowering of the production costs of the entire device) has brought the additional great advantage that the numer of the permissible load change cycles for the Bourdon tube which is applied with the high pressure differences up to about 0.9 bar in the intake manifold could be considerably increased in the simplest manner in that the changes in the shape or dimension or deformations of this Bourdon tube which is applied with the suction pressure have been considerably reduced by support over or via the correspondingly stiffly or rigidly formed end contact elements and consequently the material—changing stresses in the tube wall have been correspondingly reduced.

Figure 2:
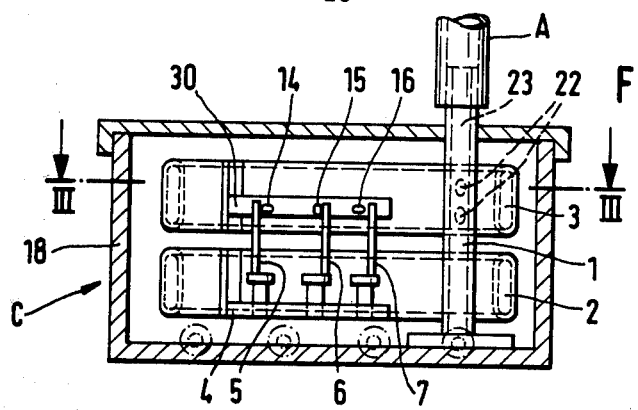
Figure 3:
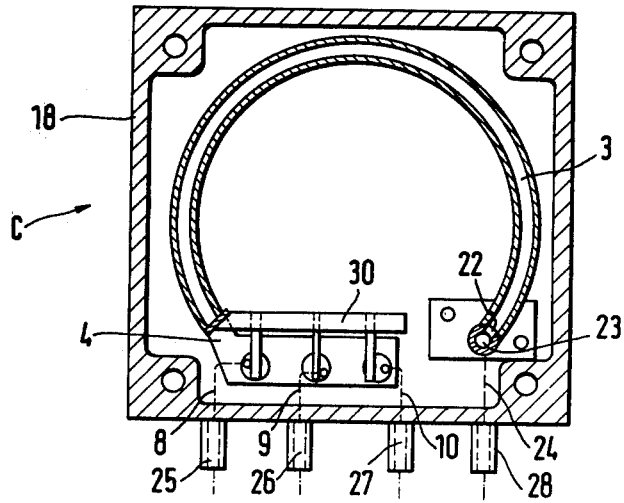

Further advantageous features of the invention result from the associated claims and the following specification of an embodiment example on the basis of the drawing with three figures. Of these show:

FIG. 1 is a block schematic diagram of the entire monitoring and indicator device, FIG. 2 is the measuring and switchgear device of the apparatus in side view with a cut-open housing, and FIG. 3 is a section along the lines III—III in FIG. 2.

In the block circuit diagram of FIG. 1 the monitoring and indicator device in accordance with the invention, corresponding with FIG. 1 of the older application P No. 25 51 359.1, there is schematically illustrated a combustion motor B with carburetor E and intake manifold G, with its intake manifold G the measuring and switchgear device C being connected via a pipeline A, which device C on the one hand is in connection with the live pole of the power supply F of the prevailing motor vehicle and being connected via a cable system H with the indicator apparatus D in the field of view of the vehicle driver. Even the possibility for actuation of one or more additional units (20) K by the measuring and switchgear device C is indicated in dot-dashed lines.

A preferred embodiment of the measuring and switchgear device C, which embodiment is illustrated in FIGS. 2 and 3 of the drawing, comprises two equally formed "Bourdon-" spring tubes 2 and 3, which with respectively each one end are fixedly connected on a common carrier 1 in parallel arrangement. Of these two Bourdon tubes, the tube 2 is closed air-tightly all around, so that only the fluctuations of the outer atmospheric air pressure cause comparatively small movements of its free end. The interior of the second Bourdon tube 3 is connected via bores 22 with the hollow space 23 of the carrier 1, which in turn is connected via the pipeline A with the intake manifold G of the combustion engine B, so that the free end of the Bourdon tube 3 attempts to move under the considerably larger fluctuations of the vacuum pressure in the intake manifold G on a parallel movement path with the end of the Bourdon tube 2, however with larger deflection. Carrier bodies 4 and 30, respectively, for a number of contact elements (in the embodiment example three each) 5, 6, 7 and 14, 15, 16, respectively, are fixedly attached on the free ends of the two Bourdon tubes 2 and 3, such that with a stopped internal combustion engine and thus even with the interior of the Bourdon tube 3 which interior is applied with atmospheric pressure, they contact or engage the comparatively bend-resistant end-contact element 14 of the carrier body 30 with a certain pretension on the counter-contact element 5 of the carrier body 4, and thereby the electrical line 8, 8' which leads to the preferably red light diode 11 is placed under voltage. With a running internal combustion engine B the interior pressure in the Bourdon tube 3 which is connected to the intake manifold G reduces proportionally to the vacuum pressure in the intake manifold and causes a corresponding deformation of the Bourdon tube 3 in the sense of a movement of the free end toward the stationary end of the Bourdon tube. As long as the internal combustion engine is in the idle running condition with a closed throttle valve, in the intake manifold the largest vacuum pressure up to approximately 0.1 bar is produced, under which the free end of the Bourdon tube 3, depending upon the dimensions of the Bourdon tube, attempts to move by approximately 6 to 8 mm in the direction toward the fixed end. With this movement the contact between the contact elements 5 and 14 opens, while the contact elements 15 and 6 as well as 16 and 7 come into engagement or contact, whereby the moreover comparatively bend-resistant pair 16 and 7 of contact elements considerably shorten the deflection path of the Bourdon tube 3 by means of the support on the Bourdon tube 2, while the middle contact element 15 is formed easily elastically bendable. In this operating condition (the idling of the internal combustion engine B), the yellow and the green light-emitting diodes 12 and 13 in the indicator device 17 receive voltage via the lines 9, 9' and 10, 10' and thus are brought to illumination, while the red light-emitting diode 11 is put out. With the opening of the throttle valve in the carburetor for the rotational speed and performance increase of the internal combustion engine B, the vacuum pressure in the intake manifold G reduces and consequently also in the interior of the Bourdon tube 3, again depending upon the position of the throttle valve and of the rotational speed of the motor, so that the free end of the Bourdon tube 3 again moves away from the fixed end, and thereby at first the contact element 16 is lifted from its counter contact element 7 and the green light-emitting diode 13 in the indicator device 17 may be put out, while the middle pair 15, 6 of the contact elements still remains closed, and via the lines 9, 9' the yellow light-emitting diode 12 again may light-up. In order to be able to precisely adjust or align the opening and closing of the pairs of contact elements on the ends of the two Bourdon tubes 2 and 3, e.g., with the help of a vacuum pump and a precision manometer, in the frame of the invention the contact elements e.g., 5, 6, 7 at least of one Bourdon tube 2 are formed easily or slightly adjustable (e.g., as an eccentric pin or the like) with respect to its common carrier body 4, which carrier body is preferably made of insulation material, while the counter electrode elements 14, 15, 16 can be rigidly attached to their carrier body 30, the latter being preferably made of metal and being connectable by a line 24 to a pole of the power supply F.

The preferred optical indicator means for the vacuum pressure which prevails in the intake manifold G of the internal combustion engine B and which vacuum pressure is ascertained or detected in the measuring and switching device C, is arranged in the form of three differently colored light diodes 11 (red), 12 (yellow) and 13 (green), or corresponding very small lamps in an additional construction of the invention, advantageously inside of a common indicator device 17 which is to be attached easily adjustable in the field of vision of the vehicle driver, which indicator device 17 preferably is formed adjustable at will with the use of permanent magnets or magnet clamps and a variable inclination holder 19.

The two Bourdon tubes 2 and 3 are accommodated with the contact elements which are actuated by them suitably inside of a spray-watertight housing 18 on which only the carrier 1 (which carrier simultaneously serves for the connection with the intake manifold G) for the Bourdon tubes 2 and 3 and the connections 25 to 28 (which connections are formed preferably as plug-in sockets or bushings) for the electrical connection lines with one pole of the power supply F and with the indicator 11 to 13 in the indicator device 17 are accessible from the outside.

For dampening of the pressure fluctuation in the Bourdon tube 3 which is applied with vacuum pressure, it has been shown advantageous that inside of the pipe-line A between the intake manifold G and the measuring and switching device C, there is arranged a hollow body 29 with a sufficiently large content and a comparatively small connection opening (which opening is formed as a throttle position) on the side pointing to the intake manifold.

In case the measuring and switching device C should be used for actuation of additional switching members such as e.g., a shut-off valve 21 in the fuel supply line to the carburetor or a switch which actuates the brake warning lights already by sudden gas-removal with high engine rotational speed, it is finally suitable to arrange preferably corresponding diodes or switching aids 20 or switch relays for engagement by one of the same contact element pairs preferably the contact elements 7, 16.

I claim:

1. Apparatus for the continuous monitoring and remote indication of the prevailing operating condition of an internal combustion engine, serving preferably as a drive for motor vehicles, on the basis of the vacuum pressure occuring in the intake manifold, comprising in combination a common carrier, two Bourdon tubes constituting pressure measuring members, said Bourdon tubes being fastened each with one end thereof fixedly on said common carrier, one of said two Bourdon tubes is completely closed and is adapted thereby to be influenced only by outside air pressure, the other of said two Bourdon tubes communicating with the intake manifold of the internal combustion engine, a first carrier body mounted at the free end of said one Bourdon tube which is influenced by the outside air pressure, a plurality of contact elements mounted on said first carrier body, indicator means, electrical lines connecting said contact elements with said indicator means, a second carrier body mounted on the free end of said other Bourdon tube which communicates with said intake manifold of the internal combustion engine, a plurality of counter contact elements mounted on said second carrier body, said counter contact elements being engageable with said first-mentioned contact elements and equal in number to that of said first mentioned contact elements, said counter contact elements including two outer of said counter contact elements being connected comparatively rigidly with said free end of said other Bourdon tube via said second carrier body, and at least one middle of said counter contact elements is slightly elastically resiliently formed.

2. Apparatus according to claim 1, wherein said contact elements of at least one of said Bourdon tubes are formed slightly adjustable.

3. Apparatus according to claim 2, wherein said contact elements of said at least one of said Bourdon tubes constitute eccentric pins.

4. Apparatus according to claim 1, further comprising a common indicator device containing said indicator means therein, said common indicator device is attachable easily in the field of view of the vehicle driver.

5. Apparatus according to claim 1, further comprising a spray water-proof housing, means for connecting said electrical lines with a current source and with said indicator means, respectively, constituting preferably plug-in bushings, said two Bourdon tubes are accommodated inside of said spray water-proof housing, only said common carrier for said Bourdon tubes and said connection means are disposed accessible from the outside, said common carrier simultaneously constitutes means for communicating said other Bourdon tube with the intake manifold.

6. Apparatus according to claim 1, further including, an indicator device containing said indicator means, magnetic clamps and an angularly-moveable holder constitute means for slightly adjusting said indicator device.

7. Appartus according to claim 1, further comprising switching members operatively connected with at least one of said contact elements which at least one of said contact elements are actuated by relative movements of said two Bourdon tubes.

8. Apparatus according to claim 7, wherein said switching members include a fuel shut-off valve.

9. Apparatus according to claim 8, wherein said switching members include a switch relay operatively connected to said at least one contact element and said additional switching members.

10. Apparatus according to claim 1, wherein said indicator means constitutes different colored diodes.

11. Apparatus according to claim 1, wherein said indicator means constitutes different lamps.

12. Apparatus according to claim 1, wherein said indicator means is an optical indicator.

* * * * *